United States Patent
Hung et al.

(10) Patent No.: US 12,238,228 B2
(45) Date of Patent: Feb. 25, 2025

(54) OPERATIONAL SAFETY USING A DISTRIBUTED LEDGER

(71) Applicant: Siemens Aktiengesellschaft, Munich (DE)

(72) Inventors: Koo Chee Hung, Stuttgart (DE); Kai Höfig, Rohrdorf (DE); Stefan Rothbauer, Augsburg (DE); Sebastian Schröck, Weil der Stadt (DE); Marian Marcel Vorderer, Rutesheim (DE); Marc Zeller, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 313 days.

(21) Appl. No.: 17/625,938

(22) PCT Filed: Jul. 20, 2020

(86) PCT No.: PCT/EP2020/070470
§ 371 (c)(1),
(2) Date: Jan. 10, 2022

(87) PCT Pub. No.: WO2021/013804
PCT Pub. Date: Jan. 28, 2021

(65) Prior Publication Data
US 2022/0271956 A1     Aug. 25, 2022

(30) Foreign Application Priority Data
Jul. 22, 2019 (EP) ..................... 19187575

(51) Int. Cl.
*H04L 27/06* (2006.01)
*H04L 9/00* (2022.01)
*H04L 9/32* (2006.01)

(52) U.S. Cl.
CPC ............. *H04L 9/50* (2022.05); *H04L 9/3239* (2013.01); *H04L 9/3247* (2013.01)

(58) Field of Classification Search
CPC ........ H04L 9/50; H04L 9/3239; H04L 9/3247
See application file for complete search history.

(56) References Cited

U.S. PATENT DOCUMENTS

2018/0005186 A1 * 1/2018 Hunn ................ G06F 16/219
2018/0117447 A1 * 5/2018 Tran ................ G09B 19/0038
(Continued)

FOREIGN PATENT DOCUMENTS

EP            3355230 A1 * 8/2018 ......... G05B 19/4155
WO  WO-2020046797 A1 * 3/2020 ........... G06F 16/182

OTHER PUBLICATIONS

Li et al., "Smart Transmission Grid: Vision and Framework", IEEE Transactions On Smart Grid, vol. 1, No. 2, September (Year: 2010).*

(Continued)

*Primary Examiner* — Morshed Mehedi
(74) *Attorney, Agent, or Firm* — Schmeiser, Olsen & Watts, LLP (57) ABSTRACT

Provided is a device for ensuring safe operation of a technical system configured to generate a smart contract including a condition to be fulfilled for safe operation of a technical system, to store smart contract data of the smart contract in a distributed ledger, and to determine if the technical system fulfills the condition using the smart contract.

15 Claims, 3 Drawing Sheets

(56) References Cited

U.S. PATENT DOCUMENTS

| | | | |
|---|---|---|---|
| 2019/0108140 A1* | 4/2019 | Deshpande | G06F 12/1408 |
| 2020/0074853 A1* | 3/2020 | Miller | G08G 1/012 |
| 2020/0143937 A1* | 5/2020 | Wolber | G06Q 30/0607 |
| 2020/0225643 A1* | 7/2020 | Tugbo | G05B 19/4183 |
| 2020/0358784 A1* | 11/2020 | Khaund | H04L 9/3239 |
| 2021/0349443 A1* | 11/2021 | Falk | G06F 21/64 |
| 2022/0271956 A1* | 8/2022 | Hung | H04L 9/3247 |

OTHER PUBLICATIONS

Swan, Melanie. Blockchain: Blueprint for a new economy. "O'Reilly Media, Inc.", 2015.

Rimba, Paul, et al. "Comparing blockchain and cloud services for business process execution." 2017, IEEE International Conference on Software Architecture (ICSA). IEEE, 2017.

Tschorsch, Florian, and Björn Scheuermann. "Bitcoin and beyond: A technical survey on decentralized digital currencies." IEEE Communications Surveys & Tutorials 18.3 (2016): 2084-2123.

Yasaweerasinghelage, Rajitha, Mark Staples, and Ingo Weber. "Predicting latency of blockchain-based systems using architectural modelling and simulation." 2017 IEEE International Conference on Software Architecture (ICSA). IEEE, 2017.

Nakamoto, Satoshi. "Bitcoin: A peer-to-peer electronic cash system." (2017).

Xu, Xiwei, et al. "The blockchain as a software connector." 2016 13th Working IEEE/IFIP Conference on Software Architecture (WICSA). IEEE, 2016.

Omohundro, Steve. "Cryptocurrencies, smart contracts, and artificial intelligence." AI matters 1.2 (2014): 19-21.

Weber, Ingo, et al. "Untrusted business process monitoring and execution using blockchain." International Conference on Business Process Management. Springer, Cham, 2016.

Wood, Gavin. "Ethereum: A secure decentralized generalized transaction ledger (eip-150 revision)." Online] Available: http://gavwood.com/paper.pdf (2016).

PCT International Search Report and Written Opinion of International Searching Authority mailed Oct. 19, 2020 corresponding to PCT International Application No. PCT/EP2020/070470 filed Jul. 20, 2020.

\* cited by examiner

OPERATIONAL SAFETY USING A DISTRIBUTED LEDGER

CROSS-REFERENCE TO RELATED APPLICATIONS

This application claims priority to PCT Application No. PCT/EP2020/070470, having a filing date of Jul. 20, 2020, which is based off of EP Application No. 19187575.6, having a filing date of Jul. 22, 2019, the entire contents both of which are hereby incorporated by reference.

FIELD OF TECHNOLOGY

The following relates to operating a technical system. Various examples specifically relate to techniques for ensuring safe operation of a technical system utilizing a distributed database.

BACKGROUND

In industrial environments, such as production lines, measures are taken to protect personnel from injuries by machinery. In a process to make a machinery safe, many different stakeholders such as machine vendors, owners of a production chain including a certain machinery and different certification bodies are involved, wherein information, such as involved documentary material, may be provided, modified, or updated at various points of time. Accordingly, such generated documentary material may be a complex to analyze and huge dataset. Conventional data storage may be prone to manipulation and may not include a timely log when some information or action was taken in a transparent way, wherein data integrity may not be ensured when determining, if a machinery is safe for operation.

SUMMARY

Therefore, the idea of the presented approach is to provide an advanced method and system for ensuring safe operation of a technical system, which overcome or mitigate at least some the above-identified limitations and drawbacks.

A device for ensuring safe operation of a technical system is configured to perform the following steps. In various embodiments, such a device may comprise at least one processor, a memory, and an interface, the memory containing program code executable by said at least one processor, wherein execution of the program code causes the device to execute the following steps.

In a first step, a condition for a technical system may be received by the device, wherein the technical system can be operated safely, when the condition is fulfilled. Further, the device generates a smart contract, wherein the smart contract includes the condition to be fulfilled for safe operation of the technical system.

Generating a smart contract including the condition may refer, for example, to defining a smart contract based on the condition, i.e., the smart contract is fulfilled when the condition is fulfilled. The smart contract is fulfilled if the technical system fulfills the condition.

In a further step, the device stores data related to the smart contract in a distributed ledger. In particular, smart contract data of the smart contract is stored in a distributed ledger, wherein the smart contract data identifies the smart contract.

For example, smart contract data may refer to data of a smart contract (410), which uniquely identifies, or represents, the smart contract. Accordingly, the smart contract itself may be stored inside or outside the distributed ledger to comply e.g., with storage requirements for the distributed ledger.

In a further step, the device determines if the technical system fulfills the condition for safe operation using the smart contract. In other words, the smart contract is executed, wherein the smart contract determines based on the condition included in the smart contract, if the condition is fulfilled by the technical system.

By the techniques according to embodiments of the invention, an improved technique for ensuring EHS safety of a technical system provided, whereby multiple entities, such as e.g. vendors of the technical subsystems, owners of the technical system, and certification bodies, may be provided access to a manipulation-free data storage with a timely log, e.g. when a safety risk was recognized, when technical information was available, or when an action was taken, which constitute influences on the safety of a technical system.

A complex technical system including technical subsystems and safety systems may be modeled completely in a distributed ledger as a complete hierarchy of equipment. With this approach, e.g., a production line can be modeled and stored within a blockchain. Each modeling step can be stored in the distributed ledger, and it can be traced who had provided information at which time. After this process of modeling, entities, such as a person or a machine, can sign contracts and verify the measure contracts. When all measure contracts that are related to a hazard element are signed to be valid, the hazard may be certified, which means its risk is mitigated to an acceptable level.

This mechanism may, for example in very sensitive applications such as healthcare or nuclear power plants, be advantageously used so that every startup or every time sensitive equipment is used the equipment itself may determine whether its contracts are still valid, i.e., if a valid safety certification is present. If evidence was checked in the blockchain that a safe operation may no longer be guaranteed, the certification may be automatically rendered invalid, and the machinery may not start or may not provide a service until the smart contract is certified to be valid again.

A method for ensuring safe operation of a technical system comprises the following steps. In a first step, a smart contract is generated, which includes the condition to be fulfilled for safe operation of a technical system. In a further step, smart contract data of the smart contract is stored in a distributed ledger. In a further step, is determined if the technical system fulfills the condition using the smart contract. For example, using a smart contract may refer to the smart contract being executed and determining if a condition is fulfilled condition.

A computer program comprises program code, which is to be executed by at least one processor, wherein executing the program code causes the at least one processor to carry out one of the methods for ensuring operational safety of a technical system according to the present disclosure.

A computer-readable storage medium comprises instructions which, when executed by a computer, cause the computer to carry out one of the methods for ensuring operational safety of a technical system.

For such a method, computer program product (non-transitory computer readable storage medium having instructions, which when executed by a processor, perform actions), and computer-readable storage medium one of the methods for ensuring operational safety of a technical system, technical effects may be achieved, which correspond to the technical effects described for the devices one of the methods for ensuring operational safety of a technical system according to the present disclosure.

Although specific features described in the above summary and the following detailed description are described in connection with specific examples, it is to be understood that the features may not only be used in the respective combinations, but may also be used isolated, and features from different examples may be combined with each other, and correlate to each other, unless specifically noted otherwise.

Therefore, the above summary is merely intended to give a short overview over some features of some embodiments and implementations and is not to be construed as limiting. Other embodiments may comprise other features than the ones explained above.

BRIEF DESCRIPTION

Some of the embodiments will be described in detail, with reference to the following figures, wherein like designations denote like members, wherein.

DETAILED DESCRIPTION

The above and other elements, features, steps, and concepts of the present disclosure will be more apparent from the following detailed description in accordance with exemplary embodiments of the invention, which will be explained with reference to the accompanying drawings.

It is to be understood that the following description of embodiments is not to be taken in a limiting sense. The scope of embodiments of the invention is not intended to be limited by the embodiments described hereinafter or by the drawings, which are taken to be illustrative only. The features of the various examples may be combined with each other, unless specifically noted otherwise.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Some examples of the present disclosure generally provide for a plurality of circuits, data storages, connections, or electrical devices such as e.g., processors. All references to these entities, other electrical devices, and the functionality provided by each are not intended to be limited to encompassing only what is illustrated, but to describe the inventive concept in the light of general knowledge of a person skilled in the art. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is to be appreciated that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute program code that is embodied in a non-transitory computer readable medium programmed to perform any number of the functions as disclosed.

In the following, various techniques with respect to ensuring operational safety of a technical system using a distributed database, in accordance with aspects and embodiments of the invention, will be explained. In particular, techniques for an EHS Blockchain with Smart Contracts will be described.

Blockchains provide a decentralized protected mechanism of storing transactions in a decentralized environment. Examples vary from digital currency to storing data in an internet of things application. The blockchain mechanism protects from manipulations in the log of transactions by using cryptography. A block carries a set of transactions. Each block points to its previous block using an encrypted key. Because of this, no one can manipulate a block in between and change the information in an existing block chain.

In a process to make a machinery safe, many different stakeholders such as machine vendors, owners of a production chain including a certain machinery and different certification bodies are involved, wherein information, such as involved documentary material, may be provided, modified, or updated at various points of time, such that the generated documentary material may be a complex to analyze and huge dataset. Therefore, manipulation free data storage including a timely log when some information or action was taken is necessary in a transparent way, wherein data integrity must be ensured, in order to determine if a machinery is safe for operation.

Therefore, a distributed ledger system, based e.g. on blockchain technology, is beneficial when the need for data integrity and different stakeholders are involved.

Blockchains provide a decentralized protected mechanism of storing transactions in a decentralized environment. Examples vary from digital currency to storing data in an internet of things application. The blockchain mechanism protects from manipulations in the log of transactions by using cryptography. A block carries a set of transactions. Each block points to its previous block using an encrypted key. Because of this, no one can manipulate a block in between and change the information in an existing block chain. In industrial environments where measures are taken to protect personnel from injuries by machinery, distributed ledger systems such as blockchain technology is beneficial when the need for data integrity and different stakeholders are involved. Each action taken to make a production line safe to work with can transparently be stored in such a blockchain and can be checked at any time for insufficiencies and provides information about organizations involved.

Since such information and the involved documentary material can be a complex to analyze and huge dataset, we provide here a system that involves certificates that automates the check whether a certain production line includes all necessary steps to provide safety for the personnel involved.

Blockchain is a replicated distributed ledger that verifies and stores transactions occurring in a peer-to-peer network, as described for example in the document Swan, Melanie. Blockchain: Blueprint for a new economy. "O'Reilly Media, Inc.", 2015, the document Rimba, Paul, et al. "Comparing blockchain and cloud services for business process execution." 2017 IEEE International Conference on Software Architecture (ICSA). IEEE, 2017, and the document Tschorsch, Florian, and Bjorn Scheuermann. "Bitcoin and beyond: A technical survey on decentralized digital currencies." IEEE Communications Surveys & Tutorials 18.3 (2016): 2084-2123.

Despite some drawbacks regarding performance, as described for example in the document Yasaweerasinghelage, Rajitha, Mark Staples, and Ingo Weber. "Predicting latency of blockchain-based systems using architectural modelling and simulation." 2017 IEEE International Conference on Software Architecture (ICSA). IEEE, 2017, a blockchain system does not rely on the business operations of any central trusted authority. Instead, its trustworthiness is derived from the blockchain software and incentive mechanisms for processing nodes in the network.

Figure 1:
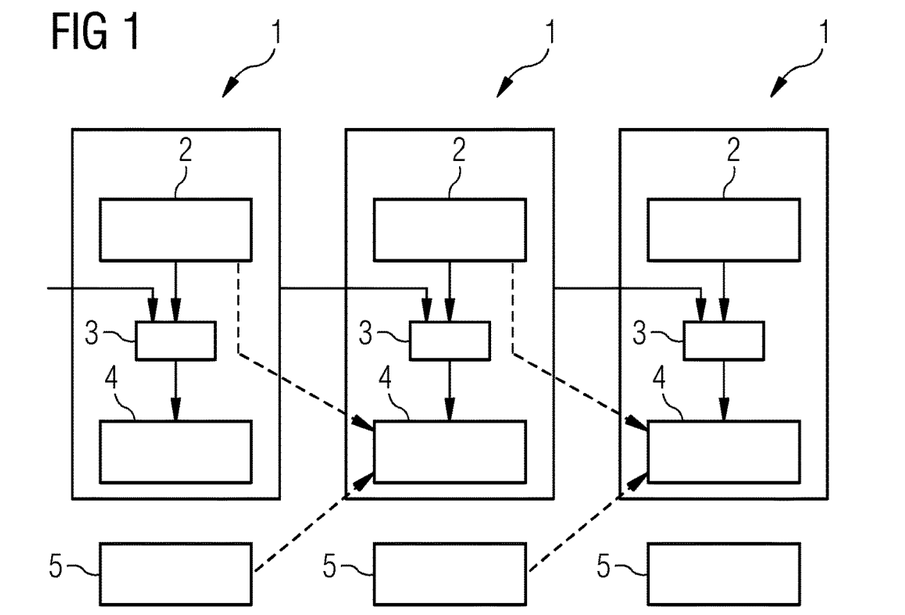
FIG. 1 schematically illustrates a blockchain technique, as known in the art.

FIG. 1 schematically illustrates a blockchain technique, as known in the art.

An example of a distributed ledger is the Blockchain. Hereinafter, various techniques will be primarily described with respect to an implementation using the Blockchain, for sake of simplicity. However, similar techniques may be readily applied to other kinds and types of distributed databases or distributed ledgers.

A distributed database may be any database implemented in a network, which is at least partly stored redundantly on several network nodes remote from each other. Blockchain technology may comprise a plurality of blocks comprising data related to transactions and/or smart contracts. Chaining of different blocks may be implemented by cryptographic hash values stored in each block, wherein each hash value may refer to data of a previous block.

Referring to FIG. 1, a blockchain comprises a plurality of blockchain data blocks 1. As depicted in FIG. 1, each data block 1 may, for example, comprise a hash value 3 build using a current (receiving) owner's public key 2 and the directly adjacent previous data block 1. Each data block 1 further may include a signature 4 of the hash value 3 by the owner of the previous data block 1 using a previous owner's private key 5.

According to various examples, certificating operational safety of the technical system may be implemented using smart contracts implemented in a Blockchain. The smart contracts may define executable program logic. The smart contracts may obtain the transport measurement data indicative of the one or more environmental conditions of the field devices during the shipment as an input.

FIG. 1 shows how the general principle of a blockchain is typically implemented. A transaction is stored in a block 1. Each block 1 is pointing to the previous block 1 using its cryptographic hash 3. A hash 3 is a digital signature of a block 1, wherein it is easy to generate a hash 3 for a block 1, but it is hard to generate a block 1 to a hash 3. In this way, it is easy to check if a hash 3 provided for block 1 is valid by simply generating it again and comparing the hash 3 to the result of the calculation. A transaction stored in a block 1 is signed by the owner of the transaction. This signature 4 becomes part of the block 1 and accordingly also becomes part of the next hash, as describe for example in the document Nakamoto, Satoshi. "Bitcoin: A peer-to-peer electronic cash system." (2017).

Using this mechanism, it is very hard to change data in an existing block. Changing data in a block, for example the transaction data, would change its hash and would invalidate the blockchain since the block after the manipulated block would have an invalid hash for the previous block.

Generating a block in a way so that it has the same hash as an existing block is possible, since the number of hashes is finite and the number of blocks is infinite, but this is mathematical hard, as described for example in the document Tschorsch, Florian, and Bjorn Scheuermann. "Bitcoin and beyond: A technical survey on decentralized digital currencies." IEEE Communications Surveys & Tutorials 18.3 (2016): 2084-2123.

A blockchain has different applications and can be used as a database, or as a software connector, as described for example in the document Xu, Xiwei, et al. "The blockchain as a software connector." 2016 13th Working IEEE/IFIP Conference on Software Architecture (WICSA). IEEE, 2016.

A distributed database may be used with smart contracts, as described for example in the document Omohundro, Steve. "Cryptocurrencies, smart contracts, and artificial intelligence." AI matters 1.2 (2014): 19-21, that allow programmable business logic or conditional transactions, as further disclosed for example in the document Weber, Ingo, et al. "Untrusted business process monitoring and execution using blockchain." International Conference on Business Process Management. Springer, Cham, 2016. Smart contracts, which are described for example in the document Tschorsch, Florian, and Bjorn Scheuermann. "Bitcoin and beyond: A technical survey on decentralized digital currencies." IEEE Communications Surveys & Tutorials 18.3 (2016): 2084-2123, are semi-autonomous programs running on the blockchain. They can store and update variables and instantiate and invoke other smart contracts. Ethereum, as described for example in the document Wood, Gavin. "Ethereum: A secure decentralized generalized transaction ledger (eip-150 revision)." Online] Available: http://gavwood.com/paper.pdf (2016), is the most widely used blockchain that supports a Turing-complete scripting language (Solidity) for smart contracts. Trust in the valid execution of the code arises from trust in the integrity of the blockchain.

Summarizing, a distributed database may be used with smart contracts that allow programmable autonomous business logic or conditional transactions to be implemented in the distributed ledger 400. Smart contracts, as known in the art, may be described, for example, as semi-autonomous programs implemented in a Blockchain. They may, when invoked, store and update variables and instantiate and invoke other smart contracts. Ethereum is the most widely used Blockchain that supports a Turing-complete scripting language (Solidity) for smart contracts. Trust in the valid execution of the code arises from trust in the integrity of the Blockchain.

Figure 2:
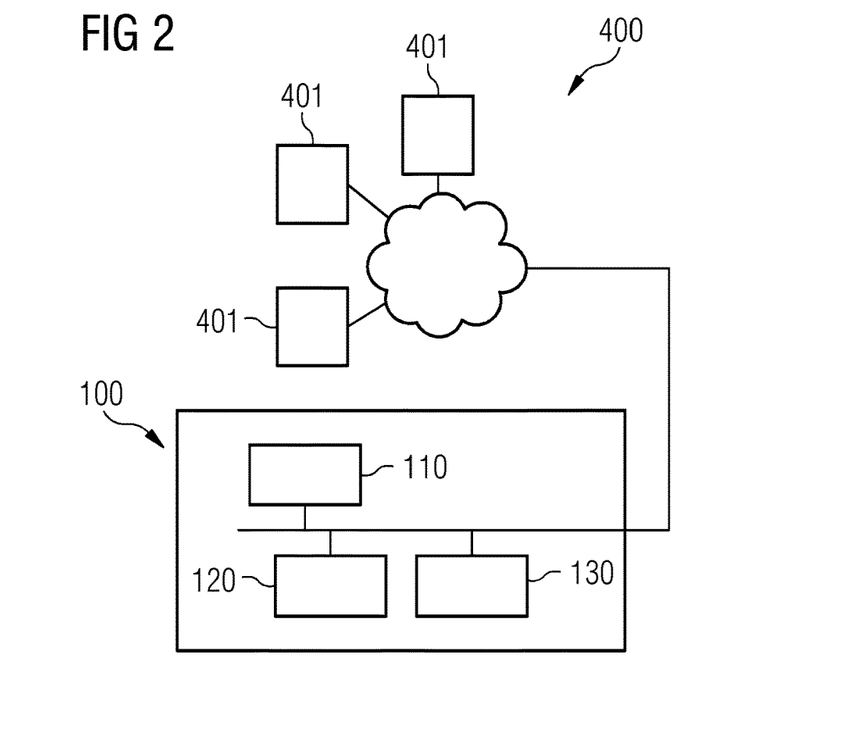
FIG. 2 illustrates a schematic drawing of a device, according to embodiments of the invention.

FIG. 2 illustrates a schematic drawing of a device 100, according to embodiments of the invention.

A device 100 includes at least one processor 110, the memory 120 and an interface 130. The device is connected to a distributed database 400 including a plurality of nodes 401. The memory 120 contains program code executable by said at least one processor 110, wherein execution of the program code causes the device 100 to execute the steps of a method according to the present disclosure.

A distributed database 400 generally may be a database that is distributed over a multitude of infrastructure nodes 410 of a corresponding infrastructure network, wherein transactions are selectively deposited in the distributed database 400 depending on a consensus between the infrastructure nodes 410. The infrastructure nodes 410 may be geographically spread across multiple sites, locations, countries, or organizations. Such a consensus may be established by an algorithm like proof of work, proof of stake, or a voting system. In particular, the distributed database may be implemented as a blockchain.

The distributed database 400 may be implemented using a distributed ledger. An example of a distributed ledger is the blockchain. Hereinafter, various techniques will be primarily described with respect to an implementation using the blockchain, for sake of simplicity. However, similar techniques may be readily applied to other kinds and types of distributed ledgers. A blockchain is a replicated distributed ledger that verifies and stores transactions occurring in a peer-to-peer network. A blockchain does normally not rely on the operations of any central trusted authority. Instead, its trustworthiness is derived from the blockchain algorithm and optionally incentive mechanisms for processing nodes in the network. Blockchains provide a decentralized protected mechanism of storing transactions. Examples of transactions include crypto currency, smart contracts, and data in an internet of things application. The blockchain protects its entries in the respective distributed database (blocks) and the corresponding log of transactions against manipulations by using cryptography. A block carries a set of transactions. Each block points to its previous block by using a hash of the previous block. Because of this, manipulating a block by changing the information is not possible or only possible to a limited degree.

Figure 3:
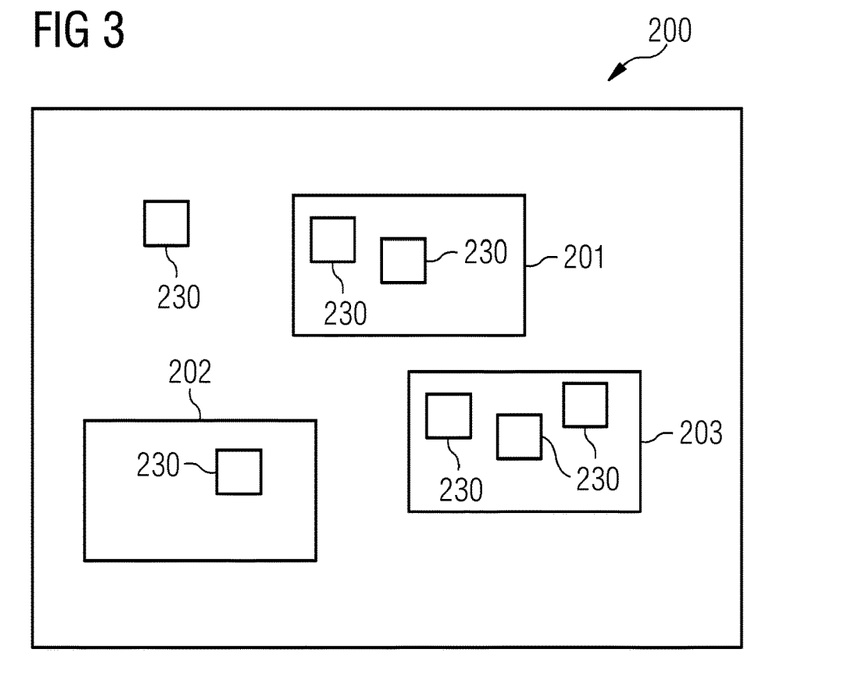
FIG. 3 schematically illustrates a technical system, according to embodiments of the invention.

FIG. 3 schematically illustrates a technical system 200, according to embodiments of the invention.

The technical system 200 comprises a number of technical subsystems 201, 202, 203. Each of the technical system 200 and the technical subsystems 201, 202, 203 may comprise one or a plurality of safety hazards, which may also be referred to as hazard elements 230, when stored in a distributed ledger. A safety hazard may refer to a hazard to the health of a person near the technical system 200.

Figure 4:
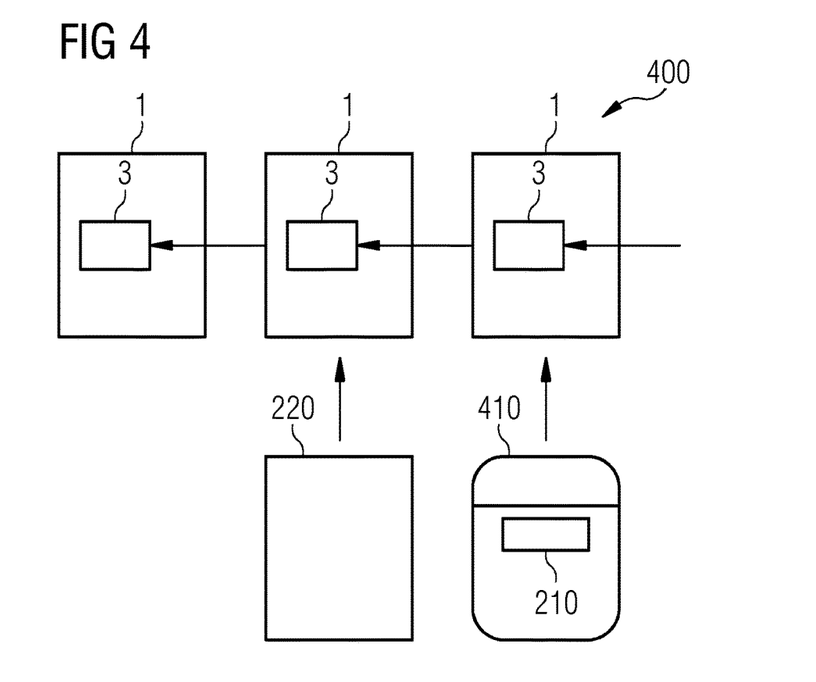
FIG. 4 illustrates a technique for storing a smart contract and technical data in a distributed ledger, according to embodiments of the invention.

FIG. 4 illustrates a technique for storing a smart contract 410 and technical data 220 in a distributed ledger 400, according to embodiments of the invention.

Referring to FIG. 4, a Blockchain 400 is schematically illustrated. For example, the Blockchain 400 may be stored in a distributed manner on multiple mining nodes 401 (as depicted in FIG. 2) of the Blockchain infrastructure. The Blockchain 400 includes multiple data blocks 1. The data blocks 1 may include transactions. For example, a data block 1 includes a checksum or hash value 3 that in some examples may be determined, at least partly, based on a directly preceding data block 1 of the Blockchain 400—e.g., a chaining checksum. Thereby, modification or tampering with the content of the Blockchain 400 becomes difficult.

It is possible to implement a smart contract 410 on the Blockchain 400. For this, the data blocks 1 and may store the smart contract 410 including a condition 210 and that can include further program code or functions. When the smart contract 210 is provided with an input, one or more of the functions of the smart contract 410 may be executed based on the input. One or more result variables may be stored in the smart contract 410, as newly inserted technical data 220 or a newly inserted hazard element 230 (as depicted in FIG. 3) of the Blockchain 200 associated with the smart contract 410.

A smart contract 410 is a computer program or a computer protocol that gets as an input a set of data and provides the answer whether the given technical data 220 fulfills the smart contract 410 or not. Without the need for trust, one may simply write down the measures taken to provide a safe technical system 200 in a digital way and a smart contract 410 would check whether all requirements, i.e., conditions 210, for a safe technical system, i.e. machinery, are fulfilled and answer yes or no.

Since in the process to make a machinery safe, many different organizations such as machine vendors, owners of a production chain including a certain machinery and different certification bodies are involved, manipulation free data storage including a timely log when some information or action was taken are necessary in a transparent and decentralized way are necessary, a decentralized ledger 400 is selected here a base technology.

A smart contract 410 for a safe machinery would simply consist of a container that can hold subcontracts 411 and the contract 410 is fulfilled if all subcontracts 411 are fulfilled. A production line, or technical system 200, may then be represented as a set of subcontracts 411 that model all the equipment, i.e., technical subsystems 210,202,203, involved in the production line. Each equipment contract can consist of other equipment contracts that model a hierarchy of equipment.

Furthermore, an equipment contract, i.e., subcontract 411, may consist of a set of hazard elements 230 that can appear when working with that specific equipment. For example, a robot arm can harm personnel. For each hazard element 230, measure contracts 412 can be associated and measure contracts 412 document which actions, i.e., measures, were taken to protect from the corresponding safety hazard.

With this simple setup, a production line can be modeled and stored within a blockchain. Each modeling step can be stored in the distributed ledger and it can be traced who had provided information at which time. After this process of modeling, people can sign contracts and verify the measure contracts. When all measure contracts that are related to a hazard element are signed to be valid, the hazard is certified, which means its risk is mitigated to an acceptable level. A quantification can also be part of the smart contract.

After all hazard elements 230 of an equipment contract 411 are certified to be mitigated to an acceptable level, the equipment is certified as a safe equipment. If all equipment contracts 411 are certified as safe, the root contract for a safe machinery, i.e., smart contract 410 for the technical system 200, is valid and the machinery is certified to be safe.

The action of certification is realized by cryptographic tokens that identify digitally all certification bodies that all participants in this process agree to.

The contracts 410,411,412 may be stored separately in an external data source that is available to all participants in this process. When stored externally, the smart contracts 410, 411,412 are addressed manipulation free by cryptographic hashes and are just referenced in the blockchain by respective smart contract data, respectively smart subcontract data, and smart measure contract data. With this mechanism, different types of smart contracts can be addressed, for example, one type of contracts can be used for the certification process in Germany and another one for the certification process in the United States. Further, a mix is possible where measure contracts are universal and used for the certification process for two countries.

Another option is to store the contracts 410,411,412 as computer source code directly in the distributed ledger, which also would protect the contracts 410,411,412 from manipulation.

Referring to FIG. 4 schematically illustrates a Blockchain 400. For example, the Blockchain 400 may be stored in a distributed manner on multiple mining nodes 401 (as depicted in FIG. 2) of the Blockchain infrastructure. The Blockchain 400 includes multiple data blocks 1. The data blocks 1 may include transactions. For example, a data block 1 includes a checksum or hash value 3 that in some examples may be determined, at least partly, based on a directly preceding data block 1 of the Blockchain 400—e.g., a chaining checksum. Thereby, modification or tampering with the content of the Blockchain 400 becomes difficult.

It is possible to implement a smart contract 410 on the Blockchain 400. For this, the data blocks 1 and may store the smart contract 410 including a condition 210 and that can include further program code or functions. When the smart contract 210 is provided with an input, one or more of the functions of the smart contract 410 may be executed based on the input. One or more result variables may be stored in the smart contract 410, as newly inserted technical data 220 or a newly inserted hazard element 230 (as depicted in FIG. 3) of the Blockchain 200 associated with the smart contract 410.

Figure 5:
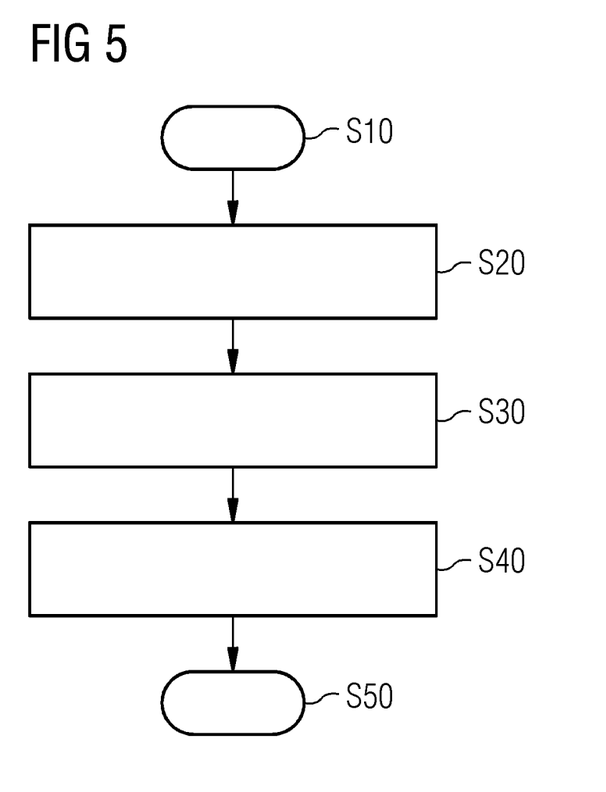
FIG. 5 illustrates a flow chart of a method for ensuring safe operation of a technical system, according to embodiments of the invention.

FIG. 5 illustrates a flow chart of a method for ensuring safe operation of a technical system, according to embodiments of the invention.

The method starts in step S10. In step S20, a smart contract 410 is generated including a condition 210 to be fulfilled for safe operation of a technical system 200. In step S30, smart contract data, which may uniquely identify the smart contract 410, of the smart contract 410 is stored in a distributed ledger 400. In step S40, it is determined if the technical system 200 fulfills the condition 210 using the smart contract 410. The method ends in step S50.

In the following examples for safe and self-supervising application of the techniques according to embodiments of the invention are explained.

Without a process involved, the aforementioned technology would not provide a sound certification process. In a practical implementation, a production line owner would open a smart contract 410 for a safe technical system 200 (i.e., a machinery, or production line) and add the digital identities of engineering personnel to the smart contract 410. Engineering would then model for example the first layer of technical subsystems 201,202,203 (i.e., equipment) involved in the technical system 200. This can be already certified equipment or new equipment that is not already certified safe.

Next, people that are responsible for the safe service of the technical system 200 would check in new unfulfilled hazard elements 230 and order the vendors engineering personnel to provide technical data 220 (i.e., documentation or documentary material of the technical system 220) how these hazard elements 230 are prevented. If additional technical subsystems (i.e., other equipment, or safety equipment) is necessary, it is also checked in into the smart contract 410 and also can have unfulfilled hazard elements 230. After the hazard elements 230 are marked as covered with measures 240, independent certification bodies can sign these measures 240 (i.e., actions) to be completed or safe. If anything changes, these signatures of certification bodies automatically become invalid, since changes are applied by adding new information, for example new technical data 220, new technical subsystems, or new hazard elements 230, to the blockchain and are put into the blockchain after the signature of the certification body.

Additionally, all information that is required by the certification body (e.g., technical data 220) can be provided by the blockchain and signed separately so that every document and every piece of information is included in the certification process. Changes cannot be made and if changes are required, new documentation evidence has to be checked into the blockchain and signed again.

In addition, if new safety hazards are discovered during the design phase or even during the phase, in which a machinery is in service, they can be checked in the blockchain and will invalidate the entire smart contract for the safe operation of the machinery. If multiple different contracts for safe machinery refer to a common set of equipment and if one of these commonly used equipment contracts loses its validity, all root contracts for safe machinery become invalid automatically.

This mechanism can, for example in very sensitive applications such as healthcare or nuclear power plants, be used so that every startup or every time sensitive equipment is used the equipment itself checks whether its contracts is still valid. If evidence was checked in the blockchain that a safe operation can no longer guaranteed, the machinery would start and would not provide any service until the smart contract is valid again.

From the above said, some general conclusions may be drawn:

The technical system may comprise multiple technical subsystems, wherein each of the technical subsystems is to be operated safely for the technical system to be operated safely. The Multiple technical subsystems may comprise at least one subsystem and are not limited to any specific number of subsystems. The device may further be configured to perform the following steps.

In a step, the device may receive a subcondition for a technical subsystem, wherein the step condition is to be fulfilled for safe operation of the technical subsystem. In various examples, the device may receive at least one sub one condition, or a plurality of step conditions, for a technical subsystem.

In a further step, the device generates a smart subcontract including the subcondition, which is to be fulfilled, in order that the smart contract is fulfilled. In other words, a smart contract may include one or more smart subcontracts, wherein the smart contract may only be fulfilled, when all smart subcontracts are fulfilled. In various examples, a plurality of smart subcontracts may be generated, each including a subcondition for a technical subsystem. A smart subcontract may be defined with a subcondition in a similar manner as the smart contract is defined with the condition.

In a further step, the device stores smart subcontract data of the smart subcontract in the distributed ledger. Like the smart contract data, the smart subcontract data may identify the smart subcontract.

In a further step, the device determines if the technical subsystem fulfills the subcondition using the smart subcontract, respectively each of the plurality of smart subcontracts. Accordingly, the device may determine if the smart contract is fulfilled, by determining if each of the smart subcontracts is fulfilled.

The device may be further configured to store technical data of the technical system in the distributed ledger. Technical data may comprise e.g., technical documentation of the technical system. Further, the device may be configured to determine, if a smart contract or subcontract is fulfilled using the respective smart contract and using the technical data stored in the distributed ledger. Accordingly, the device determines if the technical system or subsystem fulfills the condition respectively subcondition, by executing the respective smart contract, wherein it is determined if the condition or subcondition included in the smart contract is fulfilled by the technical data stored in the distributed ledger.

In various examples, determining if the condition is fulfilled by the smart contract comprises determining if each of a plurality of subconditions is fulfilled by the smart subcontracts by comparing technical data stored in the distributed ledger with the subcondition.

The smart contract, and the smart subcontract, may comprise at least one hazard element, wherein the hazard element identifies a safety hazard of the technical system, respectively technical subsystem.

The at least one hazard element may be associated with a measure to be completed for safe operation of the technical system. In other words, the measure may define an action to be completed before safe operation of the technical system is ensured. In various examples, the at least one hazard element comprises a plurality of hazard elements. Therein, one or more measures may be defined for each of the at least one hazard element.

The device may be configured to generate a smart measure contract including the measure. In some examples, the smart measure contract may be regarded as a smart subcontract of the smart contract. In various examples, each of a plurality of smart measures may be included in a respective smart measure contract, which are to be fulfilled for the smart contract to be fulfilled. The smart measure contract may be defined, such that it is fulfilled if the measure is completed.

In a similar manner as smart contract data may be stored in the distributed ledger, smart measure contract data may be stored in the distributed ledger identifying each smart measure contract.

In a further step, the device may determine if a measure is completed, using the smart measure contract.

In general, each of the smart contract, the smart subcontract and the smart measure contract, may be referred to and function as a smart contract known in the art.

The device may further be configured to store a new hazard in the smart contract, or smart subcontract, in the distributed ledger. The new hazard element may be checked in, in other words stored, and associated with the technical system or subsystem. The new hazard element may be checked in by an entity, which may be a person or machine, wherein the new hazard element may be comprised in an external database and may be automatically checked in the distributed database.

For example, a smart contract representing operational safety of a technical system may be checked in by at least one certification body, which or participants have agreed on. The smart contract may be used to automatically certify operational safety, if all conditions, subconditions, and measures have been fulfilled respectively completed, and the smart contract may additionally be certified by at least one certification body after it is fulfilled. In this regard, certifying may refer to signing the smart contract.

Likewise, a smart subcontract may be checked in by an entity made responsible by a certification body for creating the smart contract and may additionally certified or signed by at least one certification body. Accordingly, the device may be configured to sign the smart measure contract by an entity responsible for performing, i.e., completing, the measure. An entity may be a human person or a machine.

The device may be configured to sign the at least one smart contract, or smart subcontract, or smart measure contract by a certification entity, after the respective smart contract has been determined to be fulfilled. A certification entity may refer to an entity, which is responsible for the certification of safety of the technical system.

For example, a smart measure contract may be checked in and signed by an entity made responsible for completing the task, or measure, wherein the smart measure contract may be assigned by the responsible entity and may additionally be signed by the certification body.

For example, a hazard element may be checked in by any of an operator, an owner, a vendor, and a certification body, of a technical subsystem.

The device may be configured to invalidate a signature of the smart contract, smart subcontract, or smart measure contract, when new technical data or a new hated element has been stored in the distributed ledger.

The at least one condition for the technical system or a technical subsystem may be a requirement according to an Environmental Health and Safety (EHS) industry standard applicable to the technical system, wherein and the smart contract may be an operating permission of the technical system.

A smart contract, or smart subcontract may comprise a risk quantification threshold, wherein fulfillment of the smart contract is determined based on a comparison of a risk quantification value associated with a hazard element, which is included in the smart contract, with the risk quantification threshold. A risk quantification value may be a risk priority value, as known in the art, for the safety hazard. If the risk quantification value of a hazard element is below one the risk quantification threshold, for example because a measure for the hazard element may be completed, the smart contract may be fulfilled.

The technical system may be a production line, or machinery, and the technical subsystems may be machines, or equipment, of the production line.

A smart contract itself may not be stored, i.e., directly stored, in the distributed ledger, i.e. may be stored outside the distributed ledger, and the smart contract data may comprise an identifier referring to the smart contract, which may be a hashing function value of the smart contract or a pointer to the smart contract stored outside the distributed ledger. In various other embodiments, the smart contract data may comprise the smart contract, i.e., the smart contract may be stored in the distributed ledger.

In the same way, the smart subcontract or smart measure contract may not be directly stored in the in the distributed ledger, wherein the above description applies likewise for the smart subcontract data, and smart measure contract data. In other words, the smart subcontract and smart measure contract may be stored outside the distributed ledger, and the smart subcontract data and the smart measure contract data may comprise an identifier referring to the the smart subcontract respectively smart measure contract, which may be a hashing function value or a pointer. The smart subcontract data may comprise the smart subcontract, i.e., the smart subcontract may be stored in the distributed ledger. The smart measure contract data may comprise the smart measure contract, i.e., the smart measure contract may be stored in the distributed ledger.

Likewise, technical information, in other words specifications, of the technical system and/or the technical subsystems, i.e. defining the technical system and/or the technical subsystems, which may necessary to decide if a condition or subcondition or measure is fulfilled, may not be stored in the distributed ledger, i.e. may be stored outside the distributed ledger, and the technical data stored in the distributed ledger may comprise an identifier referring to the technical information of the technical system and/or the technical subsystems, which may be a hashing function value of the technical information or a pointer to the technical information. The technical data may comprise the technical information or specifications of the technical system and/or the technical subsystems, i.e., the technical information or specifications of the technical system and/or the technical subsystems may be stored in the distributed ledger.

In a similar way as the smart contract for the technical system may contain hazard elements, a smart subcontract may comprise at least one hazard element of the corresponding technical subsystem, which identifies a safety hazard of the corresponding technical subsystem that may appear when operating the corresponding technical subsystem. The at least one hazard element may be associated with a corresponding measure to be completed for safe operation of the technical subsystem, and therefore the technical system. Accordingly, the device may be further configured to generate a smart measure contract for the at least one hazard element of the smart subcontract to be fulfilled for safe operation of the technical subsystem, and therefore the technical system, to store smart measure contract data in the distributed ledger, and to determine if the measure is completed using the smart measure contract.

Each storing operation in the distributed ledger, in particular each of storing of smart contract/subcontract data, technical data, or smart measure contract data, comprises storing the current time, specifically a timestamp, in the distributed ledger, and/or storing an identity of the entity, i.e. a person or machine responsible for the data or the contracts and initiating the storing operation.

Summarizing, in the field of operating technical systems according to industry safety standards, techniques for protecting a person from safety hazards of a technical system are provided, wherein the improved method according to the present disclosure provides a simple setup, how a production line can be modeled and stored within a blockchain. Each modeling step can be stored in the distributed ledger and it can be traced who had provided information at which time. After this process of modeling, people can sign contracts and verify the measure contracts. When all measure contracts that are related to a hazard element are signed to be valid, the hazard is certified, which means its risk is mitigated to an acceptable level.

Since in the process to make a machinery safe, many different organizations such as machine vendors, owners of a production chain including a certain machinery and different certification bodies are involved, manipulation free data storage including a timely log when some information or action was taken are necessary in a transparent and decentralized way are necessary, a decentralized ledger is selected here a base technology. This mechanism can, for example in very sensitive applications such as healthcare or nuclear power plants, be used so that every startup or every time sensitive equipment is used the equipment itself checks whether its contracts is still valid. And if evidence was checked in the blockchain that a safe operation can no longer guaranteed, the machinery would start and would not provide any service until the contract is valid again.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A device for ensuring safe operation of a technical system, the device being configured to:
   generate a smart contract including a condition, which is required to be fulfilled by the technical system for safe operation of the technical system;
   store smart contract data of the smart contract which uniquely identifies the smart contract in a distributed ledger; and
   determine if the technical system fulfills the condition using the smart contract, wherein the condition is a requirement according to an industry standard of the technical system and the smart contract is an operating permission of the technical system, further wherein the smart contract comprises at least one hazard element identifying a safety hazard of the technical system.

2. The device according to claim 1, wherein the technical system comprises multiple technical subsystems, and wherein the device is further configured to:
   obtain a subcondition for a technical subsystem to be fulfilled for safe operation of the technical subsystem;
   generate a smart subcontract of the smart contract, which is to be fulfilled for the smart contract to be fulfilled, including the subcondition;
   store smart subcontract data of the smart subcontract in the distributed ledger;
   determine if the technical subsystem fulfills the subcondition using the smart subcontract.

3. The device according to claim 1, further configured to:
   store technical data of the technical system in the distributed ledger; and
   determine if the technical system fulfills the condition using the smart contract based on the technical data.

4. The device according to claim 1, wherein the at least one hazard element includes multiple hazard elements and the technical system is certified as safe when the multiple hazard elements are mitigated to an acceptable level.

5. The device according to claim 1, wherein the at least one hazard element is associated with a measure, which is to be completed before safe operation of the technical system is ensured, and wherein the device is further configured to:
   generate a smart measure contract including the measure to be fulfilled for the smart contract to be fulfilled;
   store smart measure contract data in the distributed ledger; and
   determine if the measure is completed using the smart measure contract.

6. The device according to claim 1, wherein for the device is further configured to store a new hazard element in the smart contract in the distributed ledger.

7. The device according to claim 1, wherein the smart contract comprises a risk quantification threshold, wherein fulfillment of the smart contract is determined based on a comparison of a risk quantification value associated with a hazard element included in the smart contract with the risk quantification threshold.

8. The device according to claim 1, wherein the device is further configured to sign the smart measure contract by an entity responsible for performing the measure.

9. The device according to claim 1, wherein the device is further configured to sign the technical data by an entity responsible the technical system.

10. The device according to claim 1, wherein the device is further configured to sign the at least one smart contract, or smart subcontract, or smart measure contract additionally by a certification entity, after the respective smart contract has been fulfilled.

11. The device according to claim 10, wherein the device is further configured to invalidate the signature of the smart contract or smart subcontract, when new technical data or a new hazard element has been stored in the distributed ledger.

12. The device according to claim 1, wherein industry standard is an Environmental Health and Safety (EHS) industry standard of the technical.

13. The device according to claim 2, wherein the technical system is a production line, and the technical subsystems are machines of the production line.

14. A method for ensuring safe operation of a technical system, comprising:
   generating a smart contract including a condition, which is required to be fulfilled by the technical system for safe operation of the technical system;
   storing smart contract data of the smart contract which uniquely identifies the smart contract, in a distributed ledger; and
   determining if the technical system fulfills the condition using the smart contract, wherein the condition is a requirement according to an industry standard of the technical system and the smart contract is an operating permission of the technical system, further wherein the smart contract comprises at least one hazard element identifying a safety hazard of the technical system.

15. A computer program product having a non-transitory computer readable storage medium having instructions, which when executed by a processor, perform actions said computer program product comprising program code, which is to be executed by at least one processor, wherein executing the program code causes the at least one processor to carry out the method according to claim 14.

* * * * *